United States Patent
Matsumoto

(10) Patent No.: US 10,782,125 B2
(45) Date of Patent: Sep. 22, 2020

(54) INTERFERENCE FRINGE PROJECTION OPTICAL SYSTEM AND SHAPE MEASUREMENT APPARATUS

(71) Applicant: OLYMPUS CORPORATION, Hachioji-shi, Tokyo (JP)

(72) Inventor: Koji Matsumoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 73 days.

(21) Appl. No.: 15/794,831

(22) Filed: Oct. 26, 2017

(65) Prior Publication Data

US 2018/0045508 A1 Feb. 15, 2018

Related U.S. Application Data

(63) Continuation of application No. PCT/JP2015/064837, filed on May 18, 2015.

(51) Int. Cl.
*G01B 11/25* (2006.01)
*G01B 9/02* (2006.01)
*G01S 17/06* (2006.01)

(52) U.S. Cl.
CPC ............... *G01B 11/25* (2013.01); *G01B 9/02* (2013.01); *G01B 11/2513* (2013.01); *G01S 17/06* (2013.01)

(58) Field of Classification Search
None
See application file for complete search history.

(56) References Cited

U.S. PATENT DOCUMENTS

| 5,434,669 A | 7/1995 | Tabata et al. |
| 6,008,492 A * | 12/1999 | Slater ............ G01J 3/02 250/334 |

(Continued)

FOREIGN PATENT DOCUMENTS

| JP | 05211988 A | 8/1993 |
| JP | 7280535 | * 10/1995 |

(Continued)

OTHER PUBLICATIONS

Japanese Office Action dated Feb. 12, 2019 (and English translation thereof) issued in Japanese Application No. 2017-518713.

(Continued)

*Primary Examiner* — Dominic J Bologna
(74) *Attorney, Agent, or Firm* — Holtz, Holtz & Volek PC

(57) ABSTRACT

An interference fringe generating optical system generates an interference fringe, and a magnifying optical system magnifies the interference fringe and projects the interference fringe on an object surface. The magnifying optical system includes an incident-side lens group on the side where a light beam forming the interference fringe is incident and an exit-side lens group on the side where the light beam is emitted and the interference fringe is projected towards the object surface. The expression f1/f2>3 holds, where f1 is the focal length of the incident-side lens group, and f2 is the focal length of the exit-side lens group. The incident-side and exit-side lens groups each have a positive refractive power. The expression xd/(f1+f2)<2 is satisfied, where xd is the distance from the exit-side principal point of the incident-side lens group to the incident-side principal point of the exit-side lens group.

11 Claims, 22 Drawing Sheets

(56) References Cited

U.S. PATENT DOCUMENTS

| | | | |
|---|---|---|---|
| 2009/0225329 A1 | 9/2009 | Bendall et al. | |
| 2010/0227291 A1* | 9/2010 | Dillon | A61B 5/0084 433/29 |
| 2010/0311005 A1 | 12/2010 | Liang | |

FOREIGN PATENT DOCUMENTS

| | | | |
|---|---|---|---|
| JP | 07280535 A | 10/1995 |
| JP | 09140666 A | 6/1997 |
| JP | 3009521 B2 | 2/2000 |
| JP | 2010279695 A | 12/2010 |

OTHER PUBLICATIONS

International Search Report (ISR) and Written Opinion dated Aug. 11, 2015 issued in International Application No. PCT/JP2015/064837.

Chinese Office Action dated Apr. 4, 2019 (and English translation thereof) issued in Chinese Application No. 201580079242.7.

Chinese Office Action dated Oct. 15, 2019 (and English translation thereof) issued in Chinese Application No. 201580079242.7.

\* cited by examiner

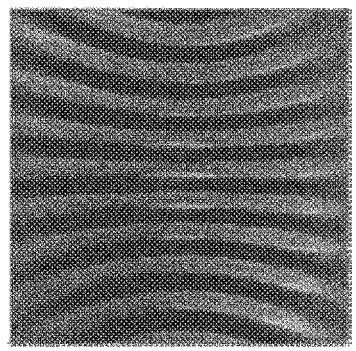
FIG. 6A    δ = 0 mm
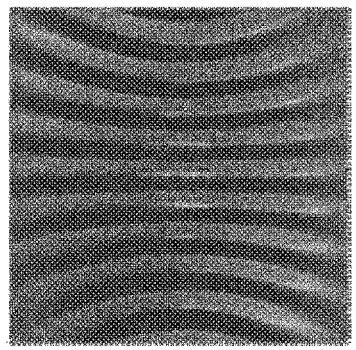
FIG. 6B    δ = 0.01 mm
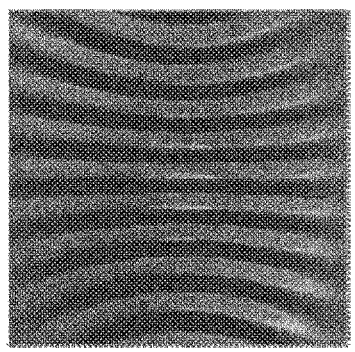
FIG. 6C    δ = 0.03 mm
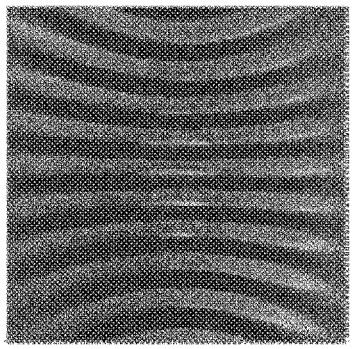
FIG. 6D    δ = 0.1 mm δ = 0 mm δ = 0.01 mm δ = 0.03 mm δ = 0.1 mm

INTERFERENCE FRINGE PROJECTION OPTICAL SYSTEM AND SHAPE MEASUREMENT APPARATUS

CROSS-REFERENCE TO RELATED APPLICATION

The present application is a Continuing Application based on International Application PCT/JP2015/064837 filed on May 18, 2015, the entire disclosure of this earlier application being incorporated herein by reference.

TECHNICAL FIELD

This disclosure relates to an interference fringe projection optical system and to a shape measurement apparatus using the same.

BACKGROUND

Shape measurement apparatuses such as the one illustrated in FIG. 25 are known. The shape measurement apparatus illustrated in FIG. 25, disclosed in patent literature 1 (PTL 1), is inserted in a body cavity or the like and measures the surface shape of an organ or the like. This shape measurement apparatus includes an interference fringe projection optical system 100, an imager 200, and a calculation controller 300 constituted by a computer or the like. The shape measurement apparatus projects an interference fringe 400 onto the object surface of a measured object with the interference fringe projection optical system 100, images the projected interference fringe 400 with the imager 200, and measures the three-dimensional shape of the object surface by analyzing the imaged interference fringe 400 with the calculation controller 300. In FIG. 25, the interference fringe 400 is depicted as being planar.

The interference fringe projection optical system 100 includes an interference fringe generating optical system 110 and a magnifying optical system 130. The interference fringe generating optical system 110 includes a light source 111, a collimator lens 112, an optical isolator 113, a coupling lens 114, a polarization-maintaining optical fiber 115, a collimator lens 116, a birefringent plate 117, and a polarizing plate 118. The magnifying optical system 130 is constituted by a single projection lens 131.

The light source 111 is, for example, configured by a semiconductor laser and is driven by the calculation controller 300 through a driver 120 to emit linearly polarized light. The light beam emitted from the light source 111 is formed as a parallel light beam by the collimator lens 112, passes through the optical isolator 113, is subsequently incident on the polarization-maintaining optical fiber 115 through the coupling lens 114, is guided by the polarization-maintaining optical fiber 115, and is emitted. The light beam emitted from the polarization-maintaining optical fiber 115 is formed as a parallel light beam by the collimator lens 116, is subsequently incident on the birefringent plate 117, and is separated into a light beam with two polarization components which are further incident on the polarizing plate 118. Only the coherent components are extracted from among the two polarization components to generate an interference fringe. The interference fringe is magnified by the projection lens 131 and projected onto the object surface as an interference fringe 400.

The shape measurement apparatus illustrated in FIG. 25 uses the projection lens 131 to magnify and project the interference fringe generated by the interference fringe generating optical system 110, thus offering the advantage of the collimator lens 116, the birefringent plate 117, the polarizing plate 118, and the projection lens 131 disposed at the tip of the shape measurement apparatus being reducible in size.

CITATION LIST

Patent Literature

PTL 1: JP 3009521 B2

SUMMARY

An interference fringe projection optical system according to this disclosure includes:

an interference fringe generating optical system configured to generate an interference fringe; and a magnifying optical system configured to magnify the interference fringe and project the interference fringe onto an object surface, wherein the magnifying optical system comprises an incident-side lens group on a side where a light beam forming the interference fringe is incident and an exit-side lens group on a side where the light beam is emitted and the interference fringe is projected towards the object surface, $f1/f2>3$, where $f1$ is a focal length of the incident-side lens group, and $f2$ is a focal length of the exit-side lens group, and the incident-side lens group and the exit-side lens group each have a positive refractive power, and an expression $xd/(f1+f2)<2$ is satisfied, where $xd$ is a distance from an exit-side principal point of the incident-side lens group to an incident-side principal point of the exit-side lens group.

A shape measurement apparatus according to this disclosure includes:

the aforementioned interference fringe projection optical system;

an imager configured to capture an image of a projected image of the interference fringe; and a calculator configured to calculate unevenness information of the object surface using an image signal from the imager.

BRIEF DESCRIPTION OF THE DRAWINGS

In the accompanying drawings:

FIG. 6A is a photograph illustrating the results of simulating the intensity distribution of the projected interference fringe when the shift amount δ of the optical axes of the polarization-maintaining optical fiber and the magnifying optical system in FIG. 5A is 0 mm;

FIG. 6B is a photograph illustrating the results of simulating the intensity distribution of the projected interference fringe when the shift amount δ of the optical axes in FIG. 5B is 0.01 mm;

FIG. 6C is a photograph illustrating the results of simulating the intensity distribution of the projected interference fringe when the shift amount δ of the optical axes in FIG. 5B is 0.03 mm;

FIG. 6D is a photograph illustrating the results of simulating the intensity distribution of the projected interference fringe when the shift amount δ of the optical axes in FIG. 5B is 0.1 mm;

DETAILED DESCRIPTION

Figure 25:
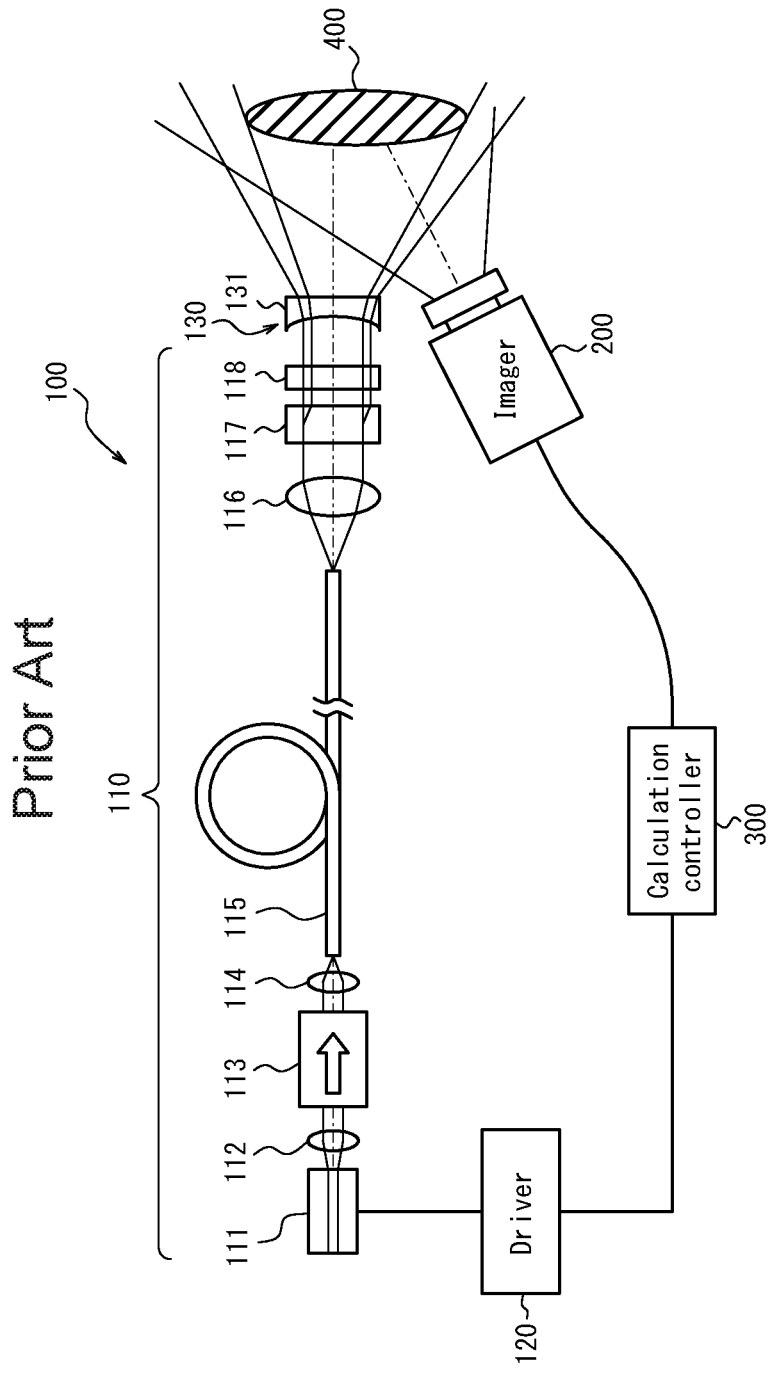
FIG. 25 illustrates a conventional shape measurement apparatus.
Figure 26:
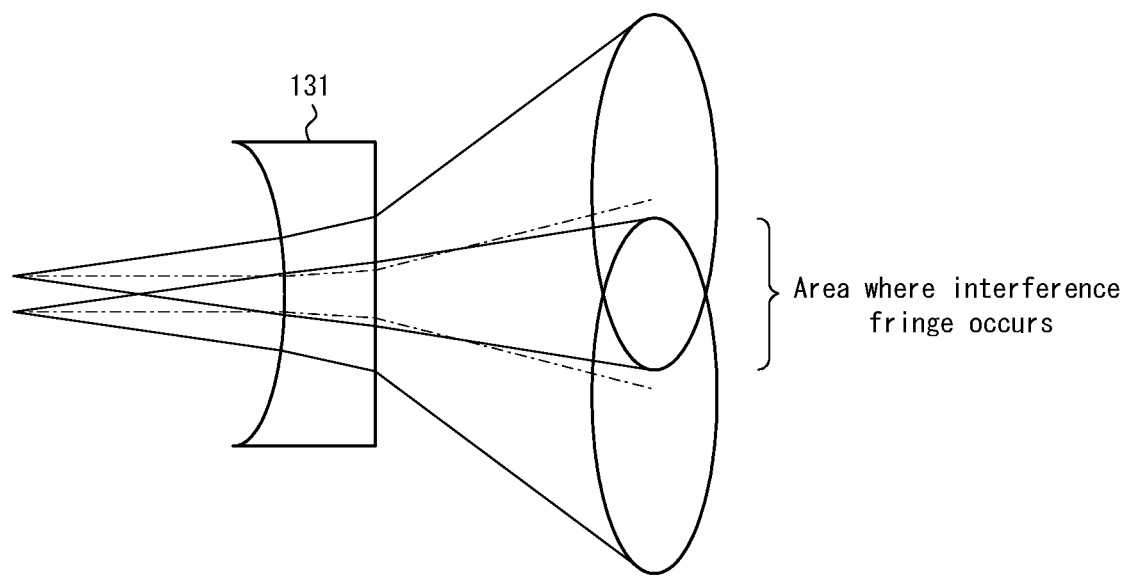
FIG. 26 is a partial detail drawing of FIG. 25.

Upon examination, I discovered a characteristic requiring improvement in the shape measurement apparatus illustrated in FIG. 25. Namely, the contrast of the interference fringe 400 projected onto the object surface decreases at the periphery, decreasing the measurement accuracy. The reason is as follows. One light beam is separated into two parallel light beams by the birefringent plate 117 and the polarizing plate 118 to generate an interference fringe. The two parallel light beams are projected separately onto the object surface by the projection lens 131, as illustrated in the partial detail drawing in FIG. 26. As a result, the two light beams do not overlap with the same intensity, leading to the phenomenon of reduced contrast in the interference fringe. In FIG. 26, the two projection areas are depicted in planar form.

In light of the above considerations, it would be helpful to provide an interference fringe projection optical system, and a shape measurement apparatus using the same, that can alleviate the reduction in contrast of the interference fringe projected onto the object surface and can measure the shape of the object surface to a high degree of accuracy.

Embodiments of this disclosure are described below with reference to the drawings.

Embodiment 1

Figure 1:
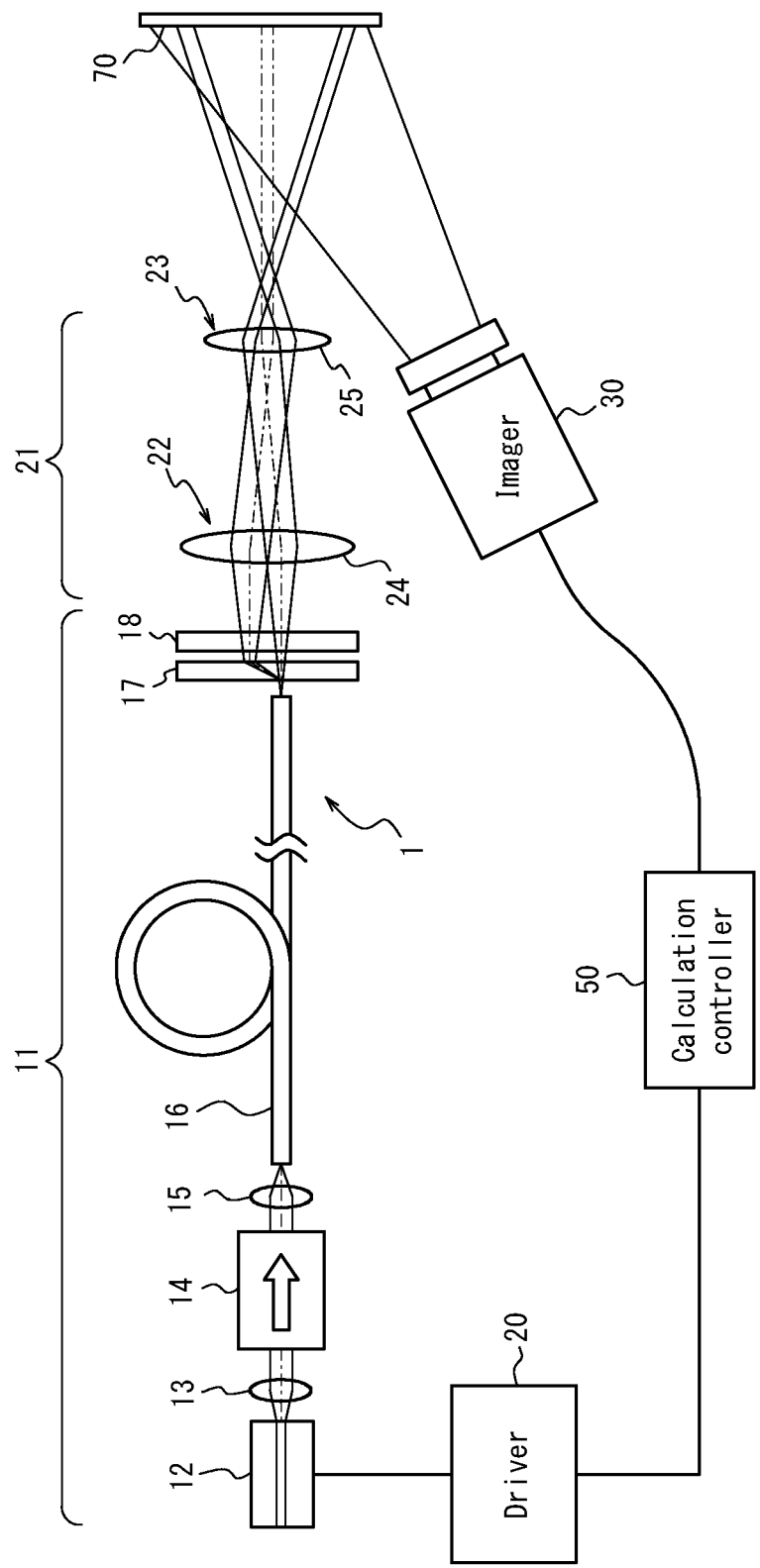
FIG. 1 schematically illustrates the main structure of a shape measurement apparatus according to Embodiment 1.

FIG. 1 schematically illustrates the main structure of a shape measurement apparatus according to Embodiment 1. Like the shape measurement apparatus illustrated in FIG. 25, the shape measurement apparatus in Embodiment 1 is inserted in a body cavity or the like to measure the surface shape of an organ or the like and includes an interference fringe projection optical system 1, an imager 30, and a calculation controller 50 constituted by a computer or the like.

The interference fringe projection optical system 1 includes an interference fringe generating optical system 11 and a magnifying optical system 21. The interference fringe generating optical system 11 includes a light source 12, a collimator lens 13, an optical isolator 14, a coupling lens 15, a polarization-maintaining optical fiber 16, a birefringent plate 17, and a polarizing plate 18. The magnifying optical system 21 is constituted by an incident-side lens group 22 and an exit-side lens group 23. In this embodiment, the incident-side lens group 22 is configured by a single lens 24 having a positive refractive power. Similarly, the exit-side lens group 23 is configured by a single lens 25 having a positive refractive power.

The light source 12 is, for example, configured by a semiconductor laser and is driven by the calculation controller 50 through a driver 20 to emit linearly polarized light. The light emitted from the light source 12 is formed as a parallel light beam by the collimator lens 13, passes through the optical isolator 14, is subsequently incident on the polarization-maintaining optical fiber 16 through the coupling lens 15, is guided by the polarization-maintaining optical fiber 16, and is emitted. The light beam emitted from the polarization-maintaining optical fiber 16 is incident on the birefringent plate 17 and is separated into a light beam with two polarization components which are further incident on the polarizing plate 18. Only the coherent components are extracted from among the two polarization components to generate the interference fringe. The interference fringe is magnified by the lens 24 and the lens 25 that configure the magnifying optical system 21 and is projected onto an object surface 70 targeted for measurement.

The shape measurement apparatus of this embodiment projects the interference fringe onto the object surface 70 with the interference fringe projection optical system 1, and while scanning the interference fringe with an interference fringe scanner, captures an image of the interference fringe on the object surface 70 with the imager 30 and inputs the resulting image signal to the calculation controller 50. The calculation controller 50 calculates unevenness information of the object surface 70 using the image signal of the interference fringe and measures a three-dimensional shape.

The interference fringe scanner can, for example, be configured by using a tunable laser for the light source 12 and scanning the interference fringe by changing the wavelength of laser light emitted from the light source 12 with the driver 20. A variety of known configurations, for example as disclosed in PTL 1, may be adopted for the interference fringe scanner, such as changing the difference in scanning path length of two light beams caused by a movable reflecting mirror to interfere, or providing a half-wave plate and a quarter-wave plate at the incident side of the polarization-maintaining optical fiber 16 and rotating the half-wave plate.

Figure 2:
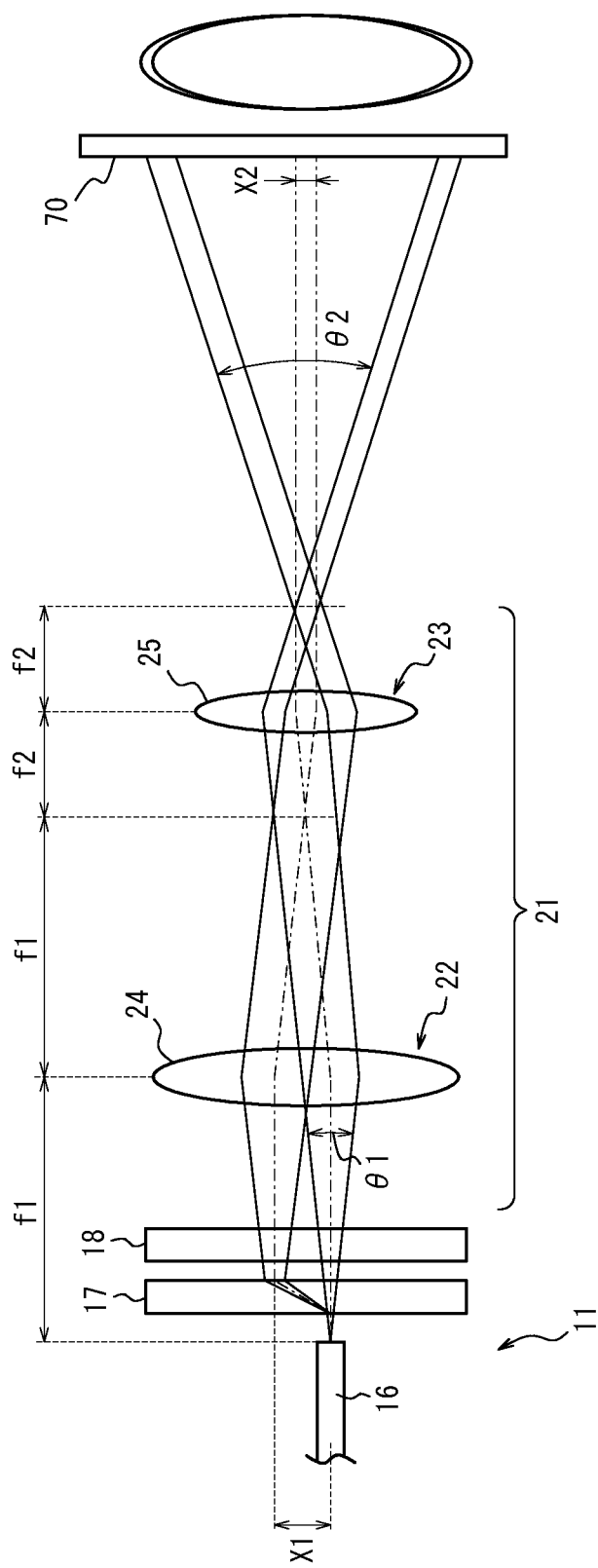
FIG. 2 is a partial enlargement of FIG. 1.

In this embodiment, as illustrated in the partial enlargement in FIG. 2, light emitted from the polarization-maintaining optical fiber 16 is separated by the birefringent plate 17 into two light beams with a divergence angle $\theta 1$. These light beams pass through the polarizing plate 18 and are magnified by the magnifying optical system 21 to a divergence angle $\theta 2$ and projected onto the object surface 70. Therefore, the magnifying optical system 21 is arranged so that the focal length f1 of the lens 24 is greater than the focal length f2 of the lens 25, the emission end face of the polarization-maintaining optical fiber 16 is positioned at the front focal position of the lens 24, and the front focal position of the lens 25 is positioned at the back focal position. In FIG. 2, the projection areas of the two light beams on the object surface 70 are also depicted in planar form.

As a result, the magnifying optical system 21 constitutes a bi-telecentric optical system, and the central light rays of the two light beams that are emitted in parallel from the polarizing plate 18 separated by a distance x1 are reduced to a distance x2 by the magnifying optical system 21 and emitted in parallel. On the exit side of the magnifying optical system 21, the two light beams separated by the birefringent plate 17 each form a spot diameter d2 that is more focused than the spot diameter d1 emitted from the polarization-maintaining optical fiber 16. Here, the spot diameter d2 is represented by Expression (1) below.

$$d2 = d1 \cdot f2/f1 \quad (1)$$

In this embodiment, the central light rays of the two light beams separated by the birefringent plate 17 are thus emitted in parallel by the magnifying optical system 21, first form a focused spot at the exit side of the magnifying optical system 21, and then are magnified again and irradiated onto the object surface 70. Accordingly, the interference fringe is generated over a wide range on the object surface 70. The light intensity I(r) and the contrast C of the interference fringe generated by light beams $a1 e^{i\theta_1} e^{i\omega t}$ and $a2 e^{i\theta_2} e^{i\omega t}$ with equivalent wavelengths and different phases are represented by Expressions (2) and (3) below.

$$I(r) = |a1 e^{i\theta 1} e^{i\omega t} + a2 e^{i\theta 2} e^{i\omega t}|^2 = a1^2 + a2^2 + 2a1a2\cos(\theta 1 - \theta 2) \quad (2)$$

$$C = \frac{I\max - I\min}{I\max + I\min} = \frac{2a1a2}{a1^2 + a2^2} \quad (3)$$

Figure 3:
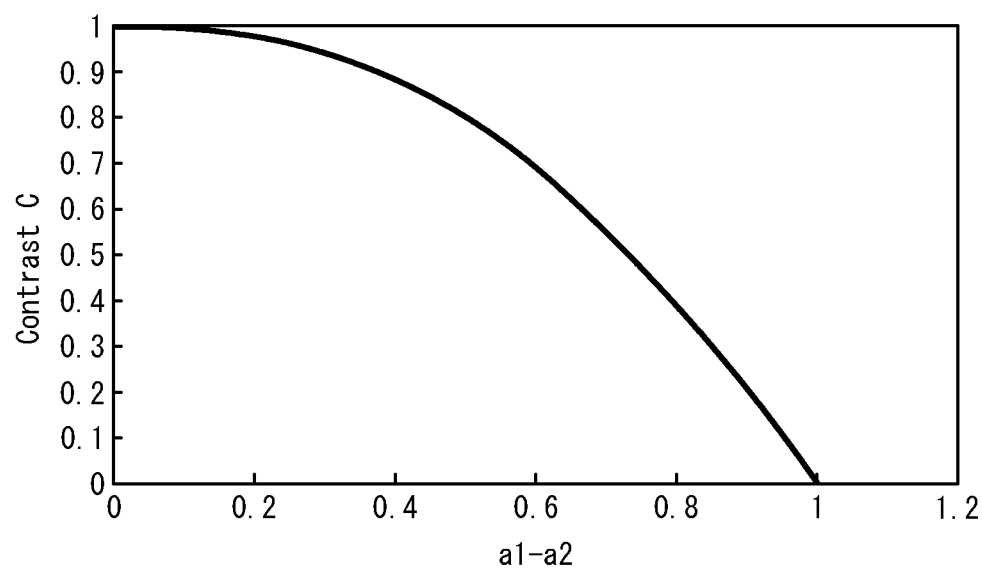
FIG. 3 illustrates contrast characteristics of an interference fringe.
Figure 4:
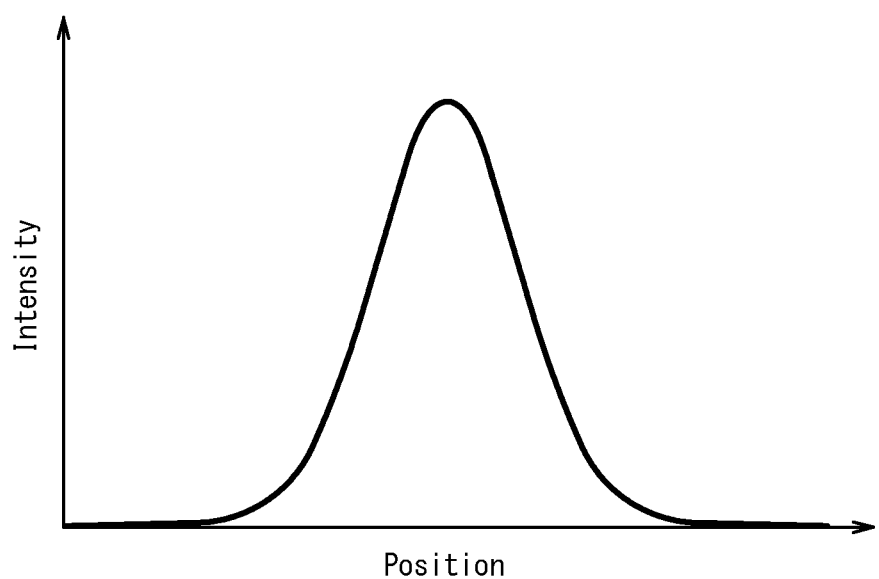
FIG. 4 illustrates an intensity distribution of a light beam.

As is clear from Expression (3), the condition for maximizing the contrast C is that the amplitude of the two light beams, a1 and a2, be equal. As the difference between the amplitudes a1 and a2 increases, the contrast C decreases, as illustrated in FIG. 3. Furthermore, as illustrated in FIG. 4, the intensity of the light emitted from the polarization-maintaining optical fiber 16 exhibits a Gaussian distribution, being greatest at the central position and falling at the edges. Therefore, the contrast C of the interference fringe reduces as the separation is greater between the two light beams.

According to this embodiment, the two light beams are projected over a wide range of the object surface 70 in a state in which the interval between the central light rays is maintained by the magnifying optical system 21, thereby allowing generation of an interference fringe with a smaller amount of reduction in contrast. Moreover, the two light beams emitted from the magnifying optical system 21 are magnified as the distance between the magnifying optical system 21 and the object surface 70 is greater, but the interval between the central light rays of the two light beams is constant. Hence, the contrast can be maintained high regardless of the distance between the magnifying optical system 21 and the object surface 70. Thus, according to this disclosure, a reduction in contrast of the interference fringe projected onto the object surface can be alleviated, and the shape of the object surface can be measured to a high degree of accuracy.

Figure 5A:
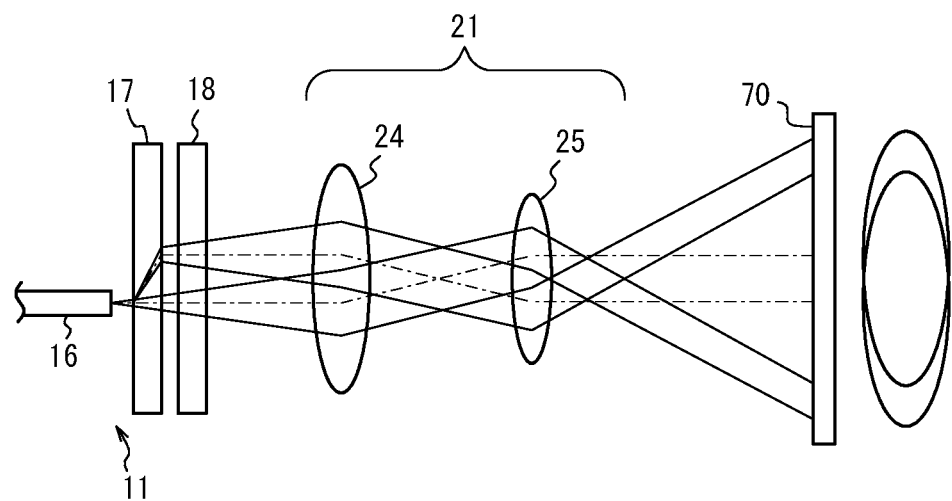
FIG. 5A illustrates the state in which the optical axes of the polarization-maintaining optical fiber and the magnifying optical system in FIG. 1 match.
Figure 5B:
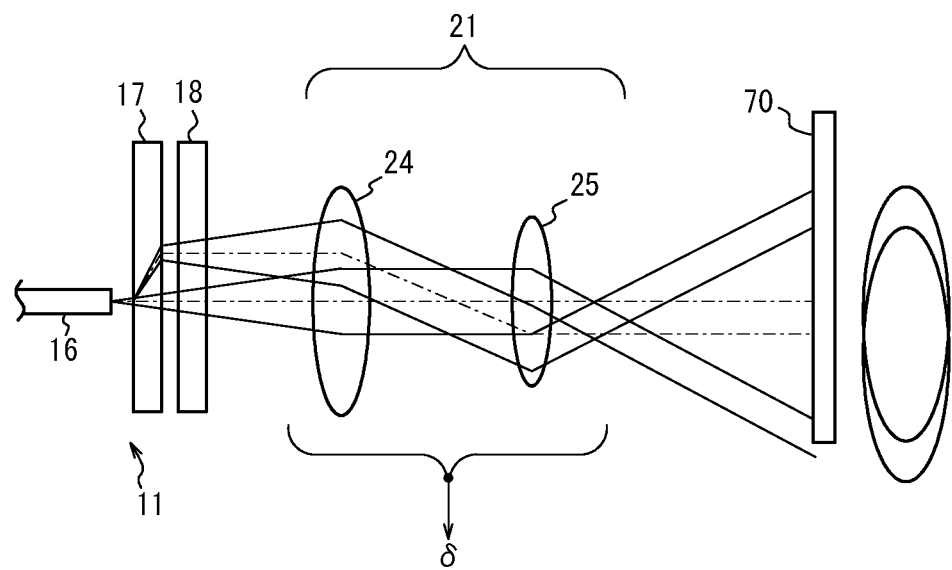
FIG. 5B illustrates a state in which the optical axis state in FIG. 5A is shifted.

According to this embodiment, the effect of a shift between the optical axes of the polarization-maintaining optical fiber 16 and the magnifying optical system 21 can also be kept to a minimum. In other words, if the optical axis state of the polarization-maintaining optical fiber 16 and the magnifying optical system 21 is shifted from the state illustrated in FIG. 5A to the state illustrated in FIG. 5B, no shift in angle occurs in the light beams emitted from the magnifying optical system 21, though the light beams themselves are shifted. In FIG. 5A and FIG. 5B, the projection areas of the two light beams on the object surface 70 are also depicted in planar form. This shift amount $\delta 1$ of the light beams is represented by Expression (4) below, where the shift amount between the optical axes of the polarization-maintaining optical fiber 16 and the magnifying optical system 21 is $\delta$.

$$\delta 1 = \delta \cdot f2/f1 \quad (4)$$

In Expression (4), the focal length f2 of the lens 25 is smaller than the focal length f1 of the lens 24. Accordingly, the shift amount $\delta 1$ of the light beams is a small value relative to the shift amount $\delta$ of the optical axes. Moreover, since the shift amount $\delta 1$ is constant, regardless of the distance between the magnifying optical system 21 and the object surface 70, the shift amount $\delta 1$ is an extremely small, negligible value relative to the light beams spread on the object surface 70 by the magnifying optical system 21. Consequently, the center position of intensity of the interference fringe does not shift greatly on the object surface 70, yielding nearly no change in the intensity of the interference fringe due to the shift amount $\delta$ of the optical axes, as illustrated in FIG. 6A to FIG. 6D. Note that FIG. 6A to FIG. 6D illustrate the results of simulating the intensity distribution of the interference fringe relative to the shift amount $\delta$ of the optical axes, where FIG. 6A illustrates the case of δ=0 mm, FIG. 6B the case of δ=0.01 mm, FIG. 6C the case of δ=0.03 mm, and FIG. 6D the case of δ=0.1 mm.

Figure 7A:
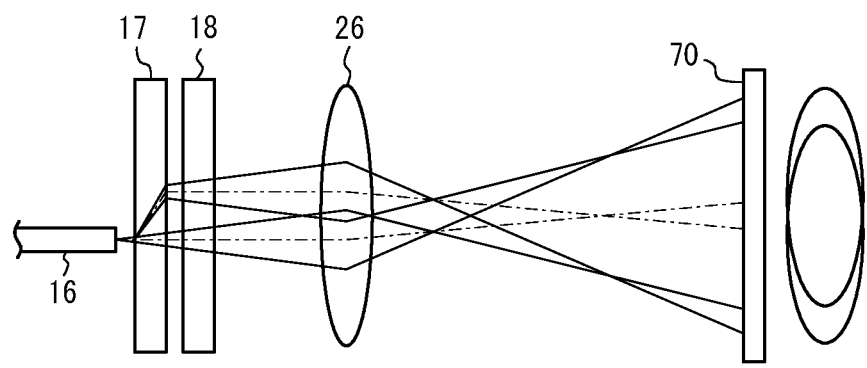
FIG. 7A illustrates the state, for comparison with FIG. 5A, in which the optical axes of the polarization-maintaining optical fiber and the lens match when the magnifying optical system is configured by a single lens.
Figure 7B:
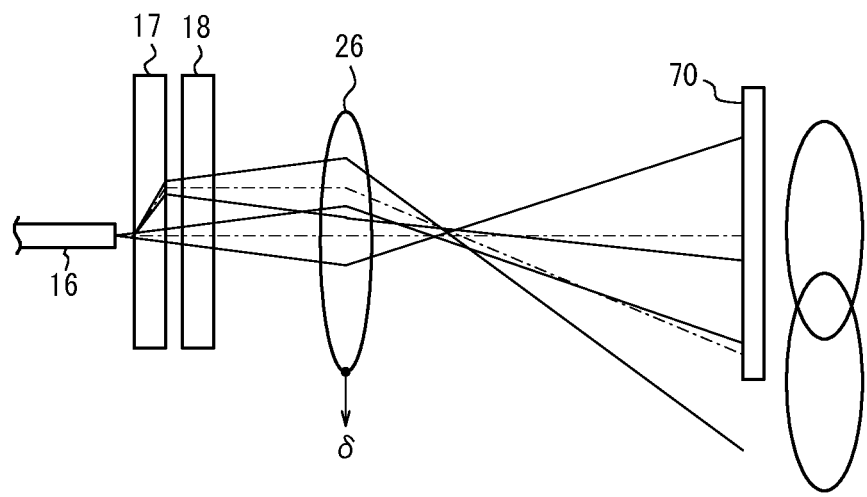
FIG. 7B illustrates a state in which the optical axis state in FIG. 7A is shifted.
Figure 8A:
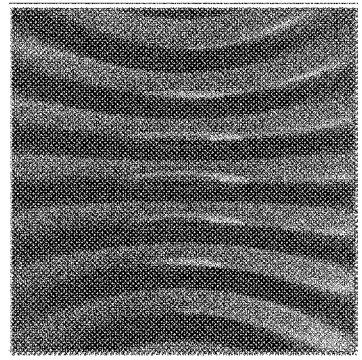
FIG. 8A is a photograph illustrating the results of simulating the intensity distribution of the projected interference fringe when the shift amount δ of the optical axes of the polarization-maintaining optical fiber and the lens in FIG. 7A is 0 mm.
Figure 8B:
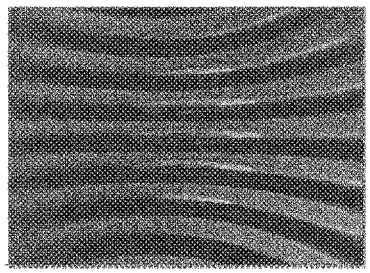
FIG. 8B is a photograph illustrating the results of simulating the intensity distribution of the projected interference fringe when the shift amount δ of the optical axes in FIG. 7B is 0.01 mm.
Figure 8C:
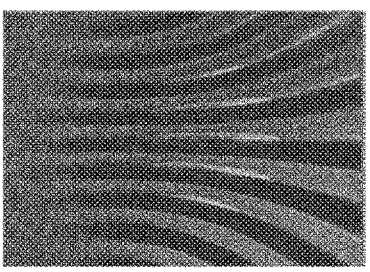
FIG. 8C is a photograph illustrating the results of simulating the intensity distribution of the projected interference fringe when the shift amount δ of the optical axes in FIG. 7B is 0.03 mm.
Figure 8D:
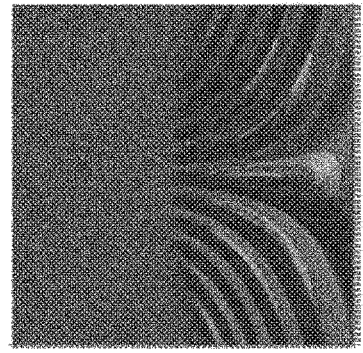
FIG. 8D is a photograph illustrating the results of simulating the intensity distribution of the projected interference fringe when the shift amount δ of the optical axes in FIG. 7B is 0.1 mm.

For the sake of comparison, FIG. 7A and FIG. 7B illustrate the effect due to optical axis shift between the polarization-maintaining optical fiber 16 and the lens 26 when the magnifying optical system is configured by a single lens 26. In FIG. 7A and FIG. 7B, the projection areas of the two light beams on the object surface 70 are also depicted in planar form. In this case, as illustrated in FIG. 7A, in a state with no optical axis shift between the polarization-maintaining optical fiber 16 and the lens 26, the center position of intensity of the interference fringe matches the optical axis position of the lens 26. However, if the optical axes of the polarization-maintaining optical fiber 16 and the lens 26 are shifted by a shift amount δ, as illustrated in FIG. 7B, then the angles of the light beams emitted from the lens 26 change from the case of FIG. 7A in accordance with the shift amount δ. As a result, depending on the light beams emitted from the lens 26, the irradiated position on the object surface 70 shifts, the center position of intensity of the interference fringe shifts, and the intensity of the interference fringe at the shifted side decreases. FIG. 8A to FIG. 8D illustrate the results of simulating the intensity distribution of the interference fringe relative to the shift amount δ of the optical axes in this case and correspond to FIGS. 6A to 6D.

As is also clear from the above comparison, according to this embodiment, the center position and intensity of the interference fringe on the object surface 70 exhibit nearly no change because of the shift amount δ of the optical axes. In other words, the interference fringe projection optical system 1 according to this embodiment can reduce the eccentric sensitivity of the polarization-maintaining optical fiber 16 and the magnifying optical system 21. Accordingly, the interference fringe projection optical system 1 is easy to assemble. In particular, the magnifying optical system 21 is easy to assemble.

Embodiment 2

Figure 9:
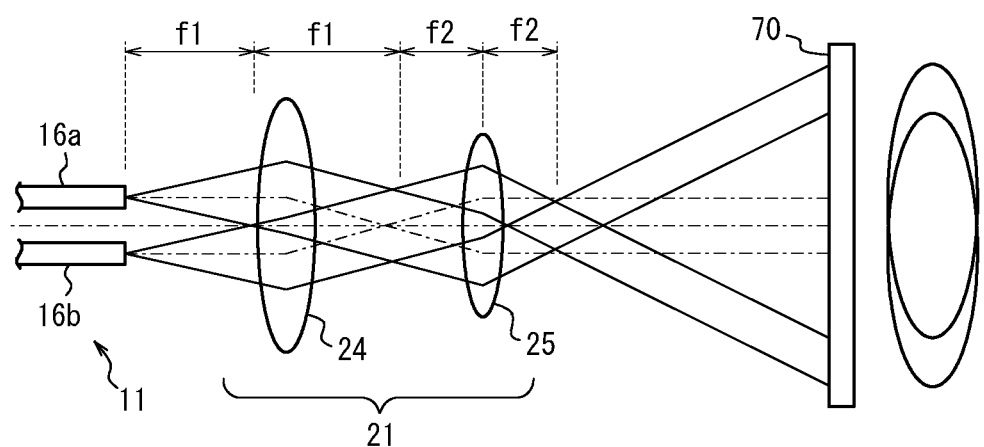
FIG. 9 illustrates the main structure of an interference fringe projection optical system according to Embodiment 2.

FIG. 9 illustrates the main structure of an interference fringe projection optical system according to Embodiment 2. In the interference fringe projection optical system 1 according to this embodiment, the interference fringe generating optical system 11 has a different configuration from the configuration illustrated in FIG. 1. Specifically, the interference fringe generating optical system 11 includes two polarization-maintaining optical fibers 16a and 16b, and the emission ends thereof are disposed side-by-side at the incident side of the magnifying optical system 21. As a result, the two emission ends of the polarization-maintaining optical fibers 16a and 16b constitute two optical emitters. The emission end faces of the polarization-maintaining optical fibers 16a and 16b are preferably disposed in the same plane, orthogonal to the optical axis of the magnifying optical system 21, at symmetrical positions about the optical axis.

Light from a light source is branched by a fiber-type optical demultiplexer (optical coupler) and caused to enter the polarization-maintaining optical fibers 16a and 16b, for example as disclosed in PTL 1. In the case of scanning the interference fringe, a known configuration may be adopted, for example by changing the phase of light guided through one of the polarization-maintaining optical fibers 16a and 16b with a fiber-type phase shift that uses stress or the like, or by using a tunable laser for the light source and differing the length of the optical path in the polarization-maintaining optical fibers 16a and 16b.

The magnifying optical system 21 is arranged so that the emission end faces of the polarization-maintaining optical fibers 16a and 16b are positioned on the focal plane at the front focal position of the lens 24, and so that the front focal position of the lens 25 is positioned at the back focal position. In FIG. 9, the projection areas of the two light beams on the object surface 70 are also depicted in planar form.

In this embodiment as well, as in Embodiment 1, the magnifying optical system 21 constitutes a bi-telecentric optical system. Furthermore, the central light rays of the two light beams emitted side-by-side in parallel from the polarization-maintaining optical fibers 16a and 16b are emitted in parallel by the magnifying optical system 21, first form a focused spot at the exit side of the magnifying optical system 21, and then are magnified again and irradiated onto the object surface 70. Accordingly, an interference fringe is generated over a wide range on the object surface 70, thus obtaining similar effects to those of Embodiment 1.

Embodiment 3

Figure 10:
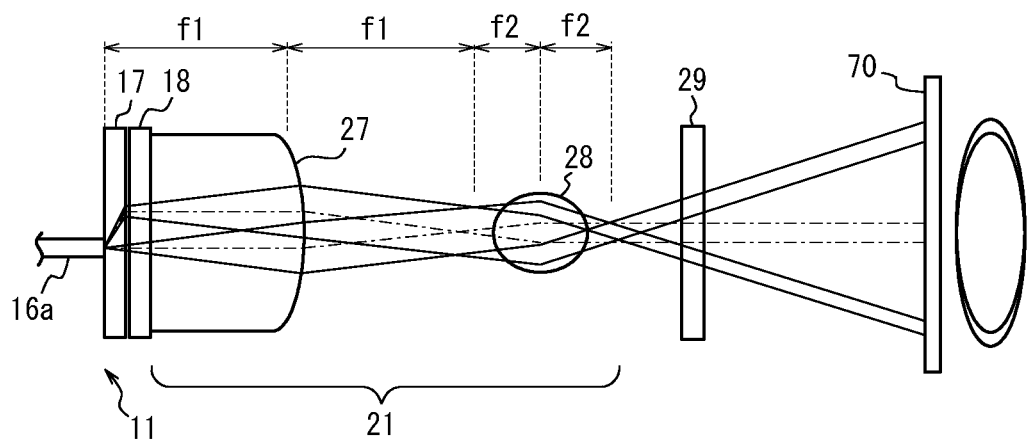
FIG. 10 illustrates the main structure of an interference fringe projection optical system according to Embodiment 3.

FIG. 10 illustrates the main structure of an interference fringe projection optical system according to Embodiment 3. The interference fringe projection optical system 1 according to this embodiment differs from the magnifying optical system 21 in Embodiment 1 in that the incident-side lens group 22 is constituted by a plano-convex lens 27, and the exit-side lens group 23 is constituted by a ball lens 28. Furthermore, a glass plate 29 that transmits the two light beams generated by the magnifying optical system 21 is disposed at the exit side of the focused spot of the two light beams. The remaining configuration is similar to that of Embodiment 1.

According to this embodiment, the incident-side lens group 22 is constituted by a plano-convex lens 27, and the emission end face of the polarization-maintaining optical fiber 16 is typically a plane perpendicular to the direction of travel of light. Therefore, the inclinations of the flat portion of the piano-convex lens 27 and the emission end face of the polarization-maintaining optical fiber 16 can easily be aligned, allowing a reduction in the performance degradation due to inclination eccentricity of the polarization-maintaining optical fiber 16 and the piano-convex lens 27. In greater detail, as illustrated in FIG. 10, the emission end face of the polarization-maintaining optical fiber 16 and the flat portion of the plano-convex lens 27 are joined by adhesive or the like via the birefringent plate 17 and the polarizing plate 18.

Figure 11:
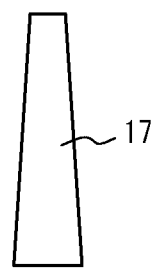
FIG. 11 illustrates a modification to the shape of the birefringent plate of FIG. 10.

With this approach, the performance degradation due to inclination eccentricity of the polarization-maintaining optical fiber 16 and the piano-convex lens 27 can be reduced, while also reducing the reflection at the flat portion of the birefringent plate 17, the flat portion of the polarizing plate 18, and the flat portion of the piano-convex lens 27, reducing the loss in emission light, and reducing the stray light (unwanted light) due to multiple reflections occurring between the emission end face of the polarization-maintaining optical fiber 16 and the flat portion of the plano-convex lens 27. As methods for reducing stray light, it is also effective, for example, to incline the birefringent plate 17 relative to the direction of travel of light, or instead of a parallel flat plate shape, to adopt a wedge prism like the one illustrated in FIG. 11. The same is also true for the polarizing plate 18 and the glass plate 29.

According to this embodiment, since the exit-side lens group 23 is constituted by a ball lens 28, the performance degradation due to inclination eccentricity can be eliminated. Furthermore, since the ball lens 28 is typically small and inexpensive to manufacture, this configuration has the advantage of reducing size and cost.

In this embodiment as well, the focused spot of the two light beams generated by the magnifying optical system 21 is generated near the exit side of the ball lens 28. Consequently, when no structure exists between the ball lens 28 and the object surface 70, it can easily be imagined that the ball lens 28 will constitute the exterior surface. In this case, dirt or the like adhering to the ball lens 28 may lead to a decrease in intensity of the interference fringe, and a decrease in contrast. Moreover, the focused spot of the two light beams generated by the magnifying optical system 21 is smaller than the spot diameter emitted from the polarization-maintaining optical fiber 16, making the focused spot easily affected by dirt or the like.

In this embodiment, however, the glass plate 29 is not affected by dirt or the like and is disposed at the exit side of the focused spot of the two light beams generated by the magnifying optical system 21, so that light beams with a sufficiently large spot diameter constitute the exterior surface. Also, by providing the glass plate 29, accidental human contact and injury can be prevented while light is being emitted.

Embodiment 4

Figure 12:
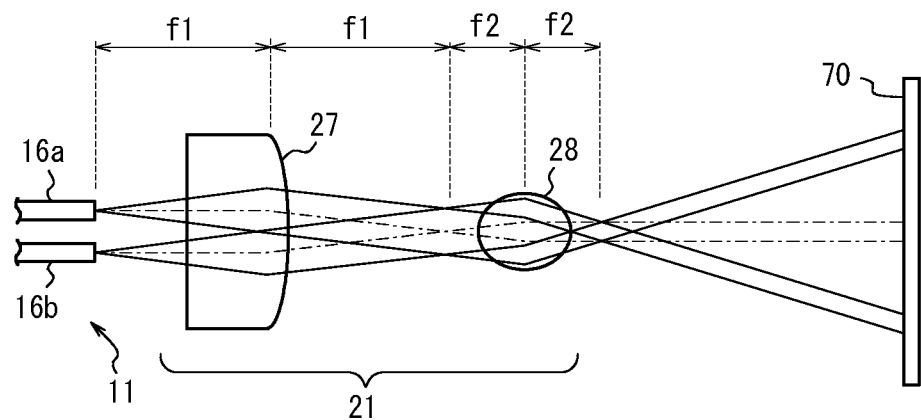
FIG. 12 illustrates the main structure of an interference fringe projection optical system according to Embodiment 4.

FIG. 12 illustrates the main structure of an interference fringe projection optical system according to Embodiment 4. In the interference fringe projection optical system 1 according to this embodiment, the interference fringe generating optical system 11 has a different configuration from the configuration illustrated in FIG. 10. Specifically, the interference fringe generating optical system 11 includes two polarization-maintaining optical fibers 16a and 16b. The two polarization-maintaining optical fibers 16a and 16b are arranged in the same way as in Embodiment 2.

The magnifying optical system 21 is arranged so that the emission end faces of the polarization-maintaining optical fibers 16a and 16b are positioned on the focal plane at the front focal position of the plano-convex lens 27, and so that the front focal position of the ball lens 28 is positioned at the back focal position. The remaining configuration is similar to that of Embodiments 2 and 3.

Accordingly, as in Embodiment 3, the size and cost can be reduced in this embodiment as well. The glass plate 29 illustrated in FIG. 10 is preferably disposed at the exit side of the ball lens 28 in this embodiment as well.

Embodiment 5

Figure 13:
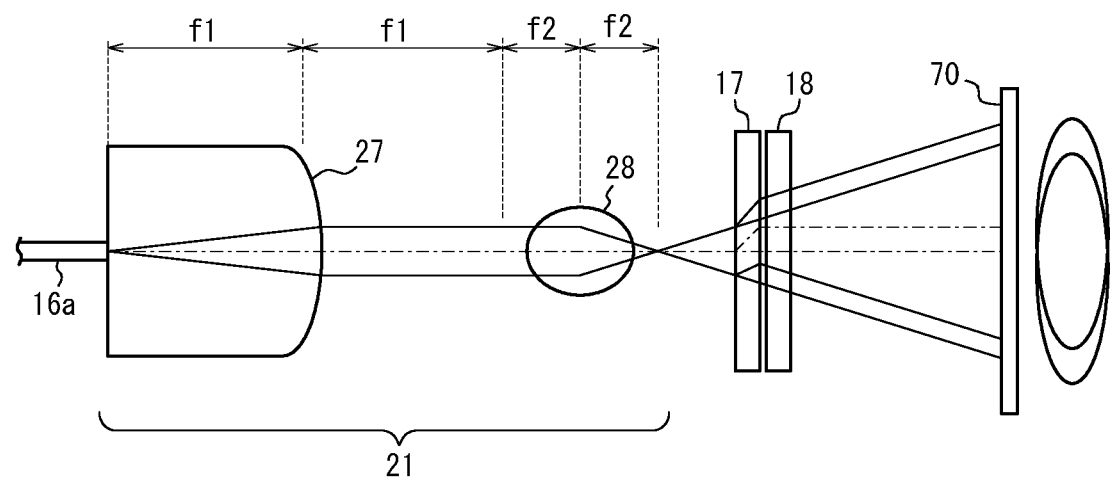
FIG. 13 illustrates the main structure of an interference fringe projection optical system according to Embodiment 5.

FIG. 13 illustrates the main structure of an interference fringe projection optical system according to Embodiment 5. The interference fringe projection optical system 1 according to this embodiment has the configuration illustrated in FIG. 10, except that the glass plate 29 is omitted by arranging the birefringent plate 17 and the polarizing plate 18 at the exit side of the ball lens 28. The remaining configuration is similar to that of Embodiment 3.

According to this embodiment, the number of components can be reduced, while also further reducing the size. In other words, in the case of Embodiment 3, the ball lens 28 needs to have a size covering twice the width of the two light beams (see FIG. 2) in addition to the effective diameter of the magnifying optical system 21. By contrast, since the birefringent plate 17 and the polarizing plate 18 are arranged on the exit side of the ball lens 28 in this embodiment, the size of the ball lens 28 need only take the effective diameter of the magnifying optical system 21 into consideration, thus allowing a more compact configuration.

Embodiment 6

Figure 14:
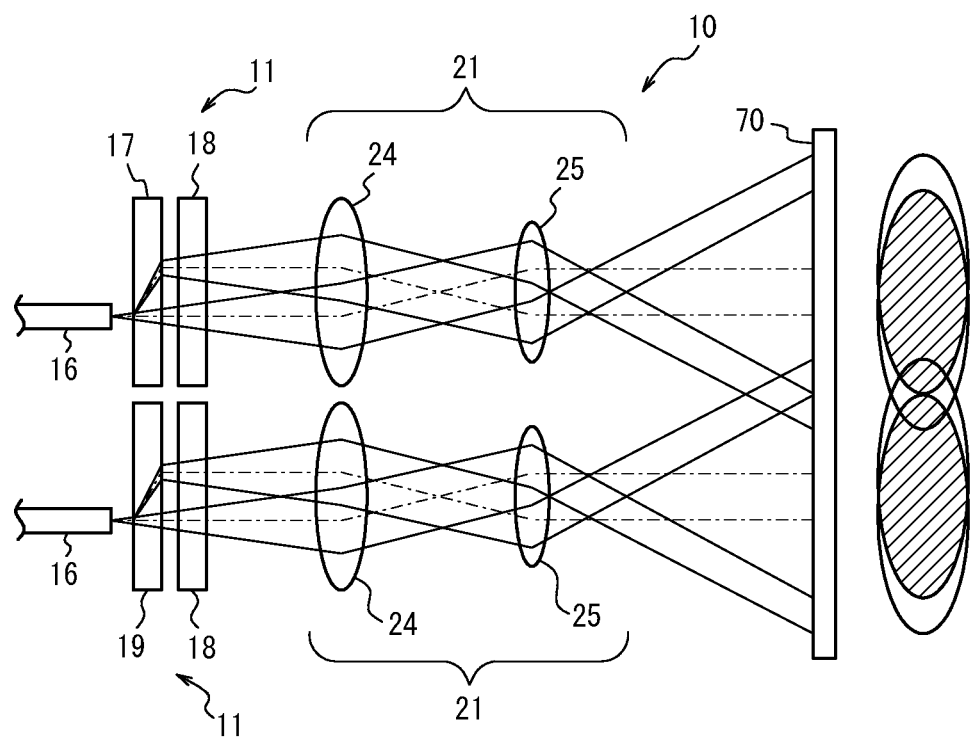
FIG. 14 illustrates the main structure of an interference fringe projection optical system according to Embodiment 6.

FIG. 14 illustrates the main structure of an interference fringe projection optical system according to Embodiment 6. An interference fringe projection optical system 10 according to this embodiment includes a plurality of the interference fringe projection optical systems 1 illustrated in Embodiments 1 to 5 above. The plurality of interference fringe projection optical systems 1 may have the same or different configurations. The plurality of interference fringe projection optical systems 1 are arranged so that the projection areas of the interference fringe from adjacent interference fringe projection optical systems 1 complement each other. For the sake of convenience, two of the interference fringe projection optical systems 1 illustrated in FIG. 1 are depicted in FIG. 14. Furthermore, in FIG. 14, the projection areas of the light beams from each interference fringe projection optical system 1 on the object surface 70 are also depicted in planar form.

In the interference fringe projection optical system 10 according to this embodiment, the plurality of interference fringe projection optical systems 1 project an interference fringe by projection areas of the interference fringe on the object surface 70 complementing each other by time division. Consequently, the shape of the object surface 70 can be measured over a wider range.

Next, the interference fringe projection optical systems 1 illustrated in Embodiments 1 to 5 are described in further detail.

For example, in the case of a configuration using one polarization-maintaining optical fiber 16, d2 is represented by Expression (1) above, where d1 is the spot diameter emitted from the polarization-maintaining optical fiber 16, and d2 is the focused spot diameter formed by the magnifying optical system 21. The divergence angle $\theta 1$ of light emitted from the polarization-maintaining optical fiber 16 (see FIG. 2) typically takes a fixed value. For example, in the case of the wavelength used in a single mode fiber being 635 nm, $\theta 1$ is approximately 10°. It is typically desired for the magnifying optical system 21 to be reduced in size until equaling the effective diameter of the light beams.

The effective diameter D of the magnifying optical system 21 is calculated by Expression (5) below.

$$D = f1 \times \sin \theta 1 \tag{5}$$

Expression (6) below follows from Expression (1) and Expression (5).

$$d2 = d1 \times \sin \theta 1 \times f2/D \tag{6}$$

Figure 15:
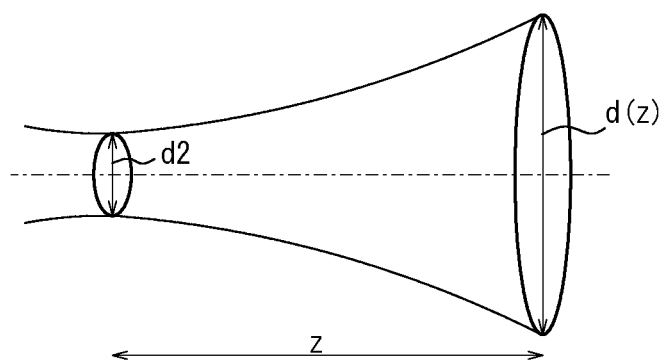
FIG. 15 illustrates the properties of a focused light beam.

To measure the shape over a wide range of the object surface 70, the light beam needs to be spread over a wide range. The light beam has the property of narrowing and expanding, as illustrated in FIG. 15, and therefore as the narrowing light beam is reduced in size, the light beam can be magnified more afterwards. In this case, the size d(z) of the light beam at a distance z from the formation position of the spot diameter d2 focused by the magnifying optical system 21 is represented by Expression (7) below, where the wavelength in use is $\lambda$.

$$d(z) = d2/2 \left\{ 1 + \left( \frac{\lambda z}{\pi \left(\frac{d2}{2}\right)^2} \right)^2 \right\}^{\frac{1}{2}} \qquad (7)$$

Figure 16:
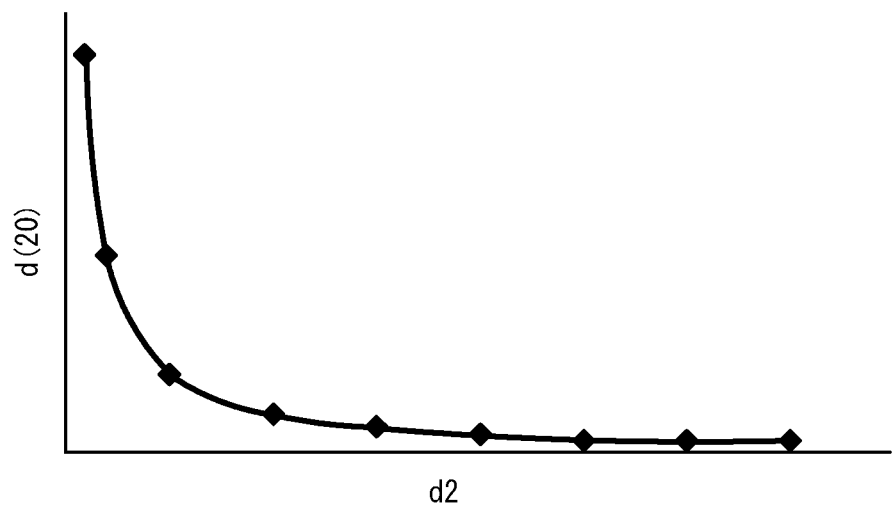
FIG. 16 illustrates the relationship between the spot diameter d2 of a focused light beam and the size d of the light beam at distance z.

FIG. 16 illustrates the relationship between the magnitude of d2 and the spot diameter d(20) when the wavelength in use λ is 635 nm and the distance z is 20 mm. As is clear from FIG. 16, as d2 is smaller, the spot diameter d(20) increases, and the light is spread over a wider area.

In order to decrease the spot diameter d2, either the focal distance f2 of the exit-side lens group 23 needs to be decreased, or the effective diameter D of the magnifying optical system 21 needs to be increased, but to reduce size at the same time, the effective diameter D is preferably not increased. Therefore, in order to reduce the spot diameter d2, it is effective to reduce the focal distance f2. To reduce the focal length f2, it is effective for the glass material of the exit-side lens group 23 to have a high refractive index. For example, using sapphire (nd=1.768) or S-LAH79 (nd=2) as the material for the exit-side lens group 23 is effective.

Next, a design example is described. Table 1 lists preconditions. In Table 1, assuming that the effective diameter D, which is an index of the size of the magnifying optical system 21, is 1 mm and that a typical fiber is used for the polarization-maintaining optical fiber 16, the spot diameter d1 emitted from the polarization-maintaining optical fiber 16 is calculated from the mode field diameter of the fiber. Also, the divergence angle θ1 of the light beam emitted from the polarization-maintaining optical fiber 16 is calculated from the NA of the fiber. Furthermore, assuming the divergence angle θ2 of the light beams emitted from the magnifying optical system 21 is 75 and that the wavelength in use λ is 635 nm, the magnitude of the most focused spot diameter d2 of the light beams formed by the magnifying optical system 21 is calculated by Expression (7).

TABLE 1

| Specifications | Calculated numerical value |
|---|---|
| Size of magnifying optical system | Effective diameter D = 1 mm |
| Divergence angle θ2 | Spot diameter d2 = 0.52 μm |
| Mode field diameter of fiber | Spot diameter d1 = 5 μm |
| NA of fiber | Divergence angle θ1 = 9.2° |

From the values of the preconditions in Table 1, the focal distance f2 of the exit-side lens group 23 is calculated as follows, using Expression (6).

$$f2 = d2 \times D/(d1 \times \sin\theta1) = 0.00052 \times 1/(0.005 \times \sin 9.2°) = 0.65 \text{ mm}$$

Furthermore, for example in the case of configuring the exit-side lens group 23 as a ball lens 28, the size (diameter) Db of the ball lens 28 can be calculated by Expression (8) from the focal length f2 and the refractive index n of the wavelength in use λ.

$$Db = f2 \times 4(n-1)/n \qquad (8)$$

Table 2 lists the refractive index n and the size Db of the ball lens 28 when the effective diameter D of the magnifying optical system 21 is 1 mm and the focal length f2 of the ball lens 28 is 0.65 mm.

TABLE 2

| Refractive index n | Size Db |
|---|---|
| 1.5 | 0.87 |
| 1.6 | 0.975 |
| 1.7 | 1.07 |
| 1.8 | 1.16 |
| 1.9 | 1.23 |
| 2.0 | 1.3 |

The size Db of the ball lens 28 needs to be greater than the effective diameter D of the magnifying optical system 21 to ensure the effective diameter D. Hence, generally a glass material with a refractive index n of 1.7 or greater (glass material with a d-line refractive index nd of 1.7 or greater) is preferably selected.

The focal length f1 of the piano-convex lens 27 constituting the incident-side lens group 22 in this case is calculated by Expression (5) as f1=6.25 mm. Accordingly, the ratio between the focal length f1 and the focal length f2 is f1/f2=9.6.

To measure the shape over a wide range of the object surface 70, the light beam needs to be spread over a wide range. In order to spread the light beam, the ratio f1/f2 preferably exceeds 3. The ratio more preferably exceeds 6. In the case of using the ball lens 28, if D and Db are approximately equal, f1/f2 is calculated by Expression (9) below, using Expression (5) and Expression (8).

$$f1/f2 = 4(n-1)/(n \times \sin\theta1) \qquad (9)$$

The size of the light beam emitted from the polarization-maintaining optical fiber 16, i.e. the NA of the polarization-maintaining optical fiber 16, is determined by the percentage decrease when the central intensity of the light beam is 100%. Typically, the NA of a fiber is determined for a light beam with an 86.5% light intensity decrease.

Figure 17:
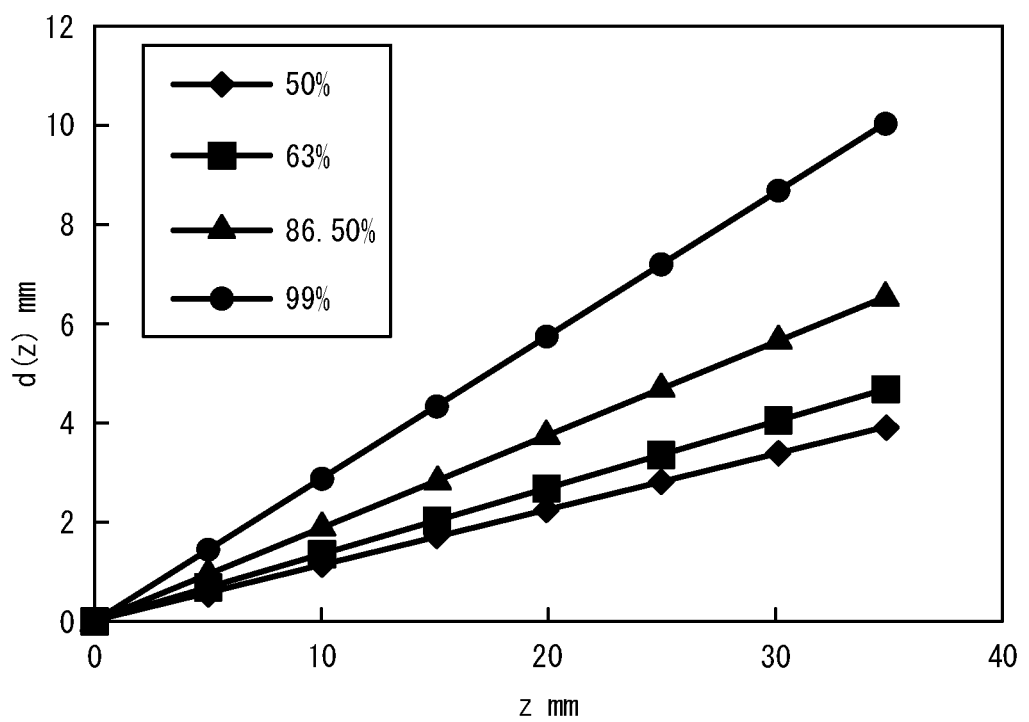
FIG. 17 illustrates the size d(z) of the light beam with respect to the distance z for each reduction in light intensity.

FIG. 17 illustrates the size d(z) of the light beam with respect to the distance z, calculated by Expression (7), for each reduction in light intensity for the case of setting the core diameter of the polarization-maintaining optical fiber 16 to 10.4 μm and the wavelength in use λ to 1550 nm. Using silicon (refractive index n=3.4 for the wavelength in use λ of 1550 nm) as the material of the ball lens 28 and setting a 50% reduction in intensity with respect to the central intensity as the NA the polarization-maintaining optical fiber 16 yields NA=0.055. Hence, f1/f2=51.33. It is thus reasonable to consider 60 to be the upper limit of f1/f2.

As described above, in the magnifying optical system 21, the front focal position of the incident-side lens group 22 is positioned at the emission end face of the polarization-maintaining optical fiber 16, and the front focal position of the exit-side lens group 23 is positioned at the back focal position of the incident-side lens group 22. Consequently, two parallel light beams separated by a distance x1 before traversing the magnifying optical system 21 are emitted by the magnifying optical system 21 in parallel, with the distance therebetween reduced to a distance x2. In other words, Expression (10) below holds between the distance xd and the focal lengths f1 and f2, where xd is the distance from the exit-side principal point of the incident-side lens group 22 to the incident-side principal point of the exit-side lens group 23.

$$Q = xd/(f1+f2) = 1 \qquad (10)$$

Figure 18:
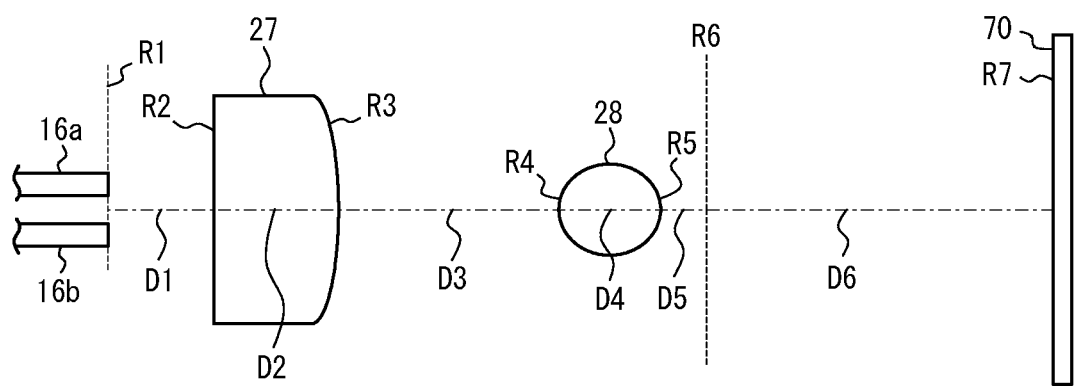
FIG. 18 illustrates the RDN surface numbers of the magnifying optical system in Embodiment 4.

Table 3 lists RDN data of the magnifying optical system 21 in Embodiment 4, illustrated in FIG. 12. The RDN surface numbers of Table 3 are listed in FIG. 18.

TABLE 3

| Surface number | R | D | Glass material | Refractive index (nd) | Focal length | Spot diameter |
|---|---|---|---|---|---|---|
| 1 | infinity | 5.497 | | | | 0.005 |
| 2 | infinity | 1 | synthetic quartz | 1.458 | 6.24 | 1 |
| 3 | −2.85 | 6.3 | | | | 1 |
| 4 | 0.55 | 1.1 | sapphire | 1.768 | 0.634 | 1 |
| 5 | −0.55 | 0.0777 | | | | 0.135 |
| 6 | infinity | 20 | | | | 0.0006 |
| 7 | infinity | | | | | 26.95 |

Figure 19:
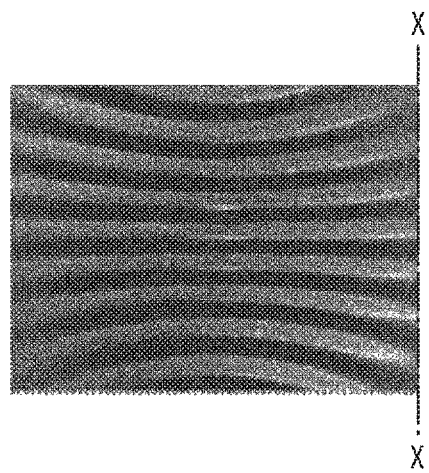
FIG. 19 is a photograph illustrating the results of simulating the intensity distribution of the interference fringe projected onto an object surface separated from the tip of the magnifying optical system by 20 mm in Embodiment 4.

FIG. 19 illustrates the results of a simulation, using the magnifying optical system 21 specified by Table 3, of the intensity distribution of the interference fringe projected onto an object surface 70 separated from the tip of the magnifying optical system 21 by 20 mm. The interval x1 between the two polarization-maintaining optical fibers 16a and 16b is 50 μm. In FIG. 19, the horizontal axis indicates an angle of view with a width of 90°, and the vertical axis indicates an angle of view with a width of 60°. Surface number 6 represents the surface (imaginary surface) on which is formed the most focused spot diameter d2 of the light beams formed by the magnifying optical system 21.

Figure 20:
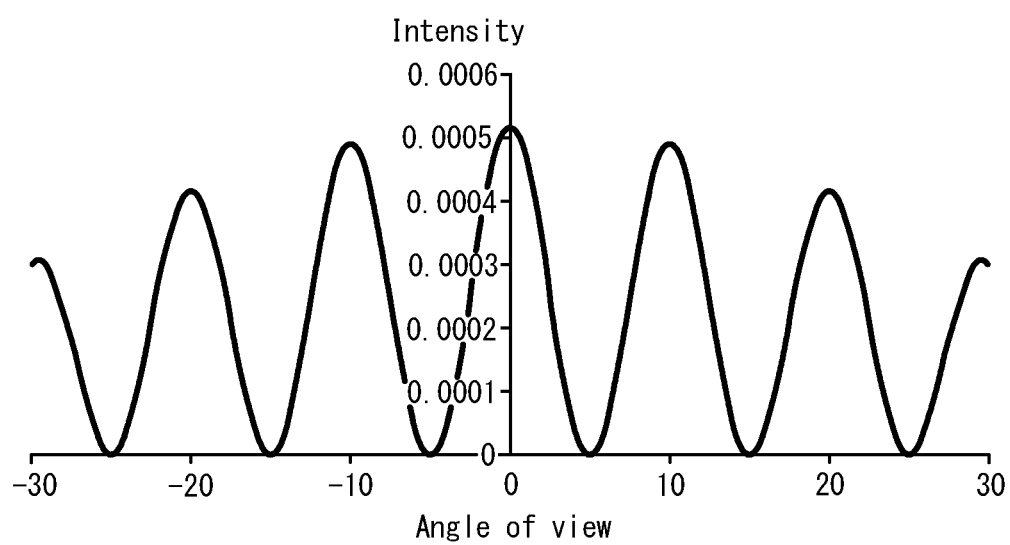
FIG. 20 illustrates an intensity distribution of the interference fringe on the X-X cross section of FIG. 19.
Figure 21:
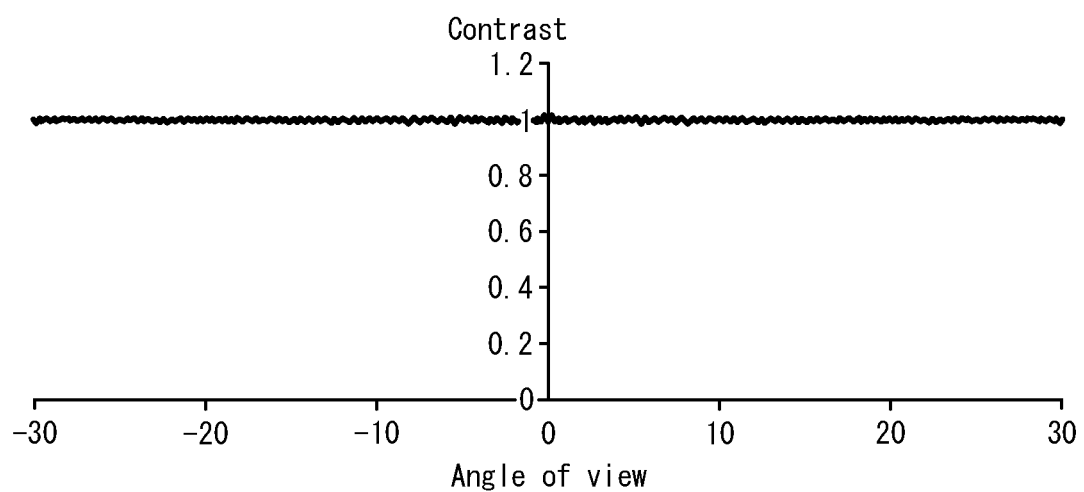
FIG. 21 illustrates the contrast distribution of the interference fringe in FIG. 19.

FIG. 20 illustrates the intensity distribution of the interference fringe on the X-X cross section of FIG. 19. FIG. 21 illustrates the distribution of the contrast C calculated with Expression (3) above. As is clear from FIG. 20 and FIG. 21, the intensity distribution of the interference fringe is such that while the intensity reduces closer to the edges, the contrast C is a high value of 1 at both the center and the edges.

Figure 22:
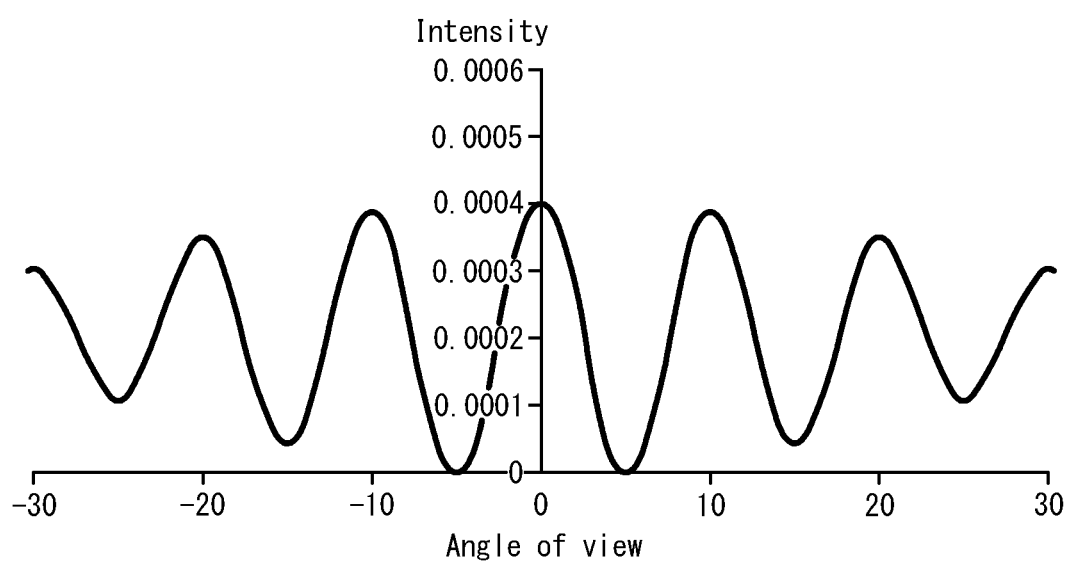
FIG. 22 illustrates the intensity distribution in the X-X cross section of FIG. 19 when the Q value in Expression (10) is greatly shifted from 1.
Figure 23:
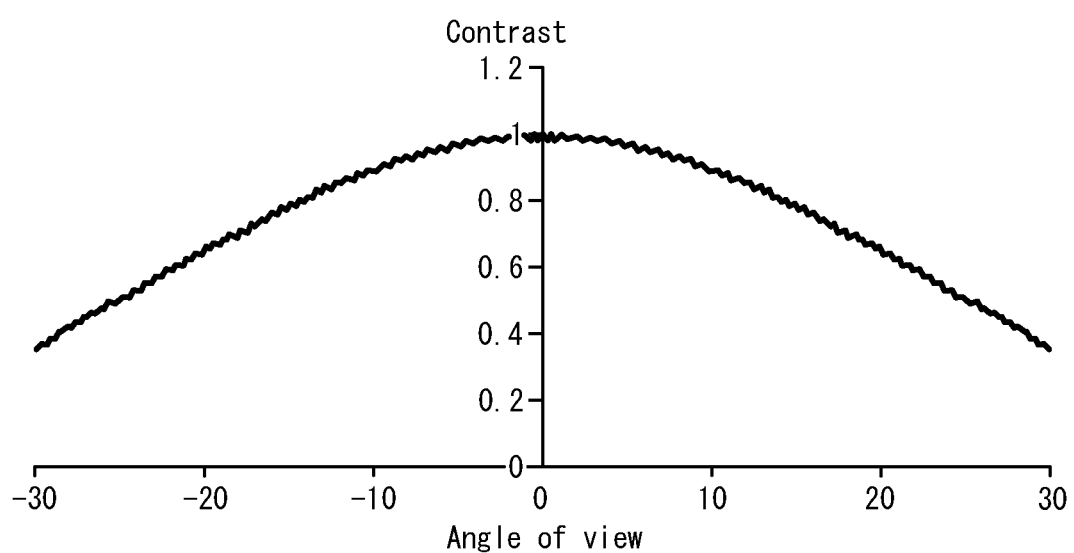
FIG. 23 illustrates the contrast distribution when the Q value in Expression (10) is greatly shifted from 1.

FIG. 22 and FIG. 23 illustrate the intensity distribution in the X-X cross section of FIG. 19 when the Q value in Expression (10) above is greatly shifted from 1 and the distribution of the contrast C from Expression (3) above. If the Q value shifts greatly from 1, the intensity distribution of the interference fringe is such that the intensity decreases closer to the edges, as illustrated in FIG. 22, but the amount of decrease does not differ greatly from when the Q value is 1. On the other hand, the distribution of the contrast C in FIG. 23 exhibits an increasingly large reduction at the edges as compared to when the Q value is 1.

Figure 24:
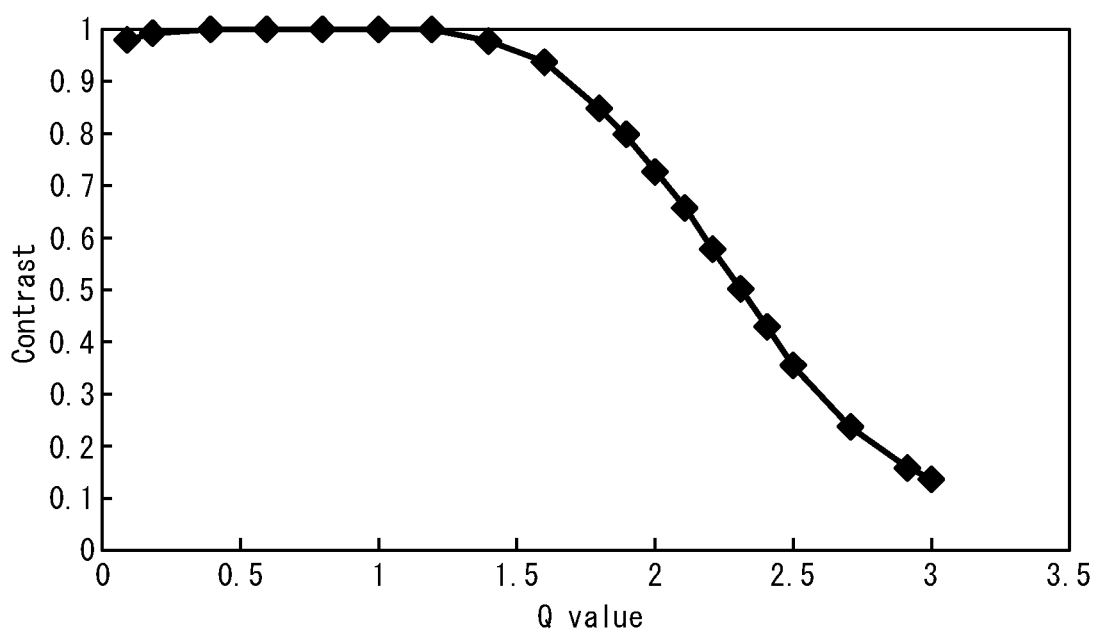
FIG. 24 illustrates the relationship between contrast and the Q value at the location where the contrast is reduced the most.

The contrast C is reduced most at the location of the maximum angle of view (for example, where the angle of view is horizontally (X) 45 and vertically (Y) 30°). FIG. 24 illustrates the relationship between the contrast C and the Q value at the location where the contrast C is reduced most. As is clear from FIG. 24, the contrast C has the highest value when Q=1 and decreases slightly, while remaining a value of almost 1, when the Q value is less than 1. The contrast C rapidly decreases, however, upon the Q value exceeding 2.

From the above results, to project an interference fringe without greatly reducing the contrast, the interval between the principal point positions of the incident-side lens group 22 and the exit-side lens group 23, i.e. the distance xd from the exit-side principal point of the incident-side lens group 22 to the incident-side principal point of the exit-side lens group 23 is preferably configured to satisfy Expression (11) below.

$$Q = xd/(f1+f2) < 2 \quad (11)$$

This disclosure is not limited to the above embodiments, and a variety of changes or modifications may be made. For example, apart from a configuration using the above-described birefringent plate 17, the interference fringe generating optical system 11 can adopt any of a variety of known configurations, such as a configuration using the polarization beam splitter or the waveguide disclosed in PTL 1, a configuration using the diffraction element or the wedge prism disclosed in JP 2005-326192 A, or a configuration using the Wollaston prism disclosed in JP H7-280535 A.

While a polarization-maintaining optical fiber is used in the above embodiments, a typical fiber, such as a single mode or multi-mode fiber, may be used. Also, depending on the object on which the interference fringe is projected, the optical emitter of the interference fringe generating optical system may be configured by a waveguide or the like, without using a fiber. The glass plate 29 illustrated in FIG. 10 may be disposed in other embodiments. Furthermore, for the purpose of inspecting shapes only to measure unevenness, the configuration for scanning the interference fringe may be omitted.

The invention claimed is:

1. An interference fringe projection optical system comprising:
    an interference fringe generating optical system configured to generate an interference fringe; and
    a magnifying optical system configured to magnify the interference fringe and project the interference fringe onto an object surface,
    wherein:
    the interference fringe generating optical system comprises two optical emitters positioned side-by-side on an incident-side of the magnifying optical system,
    the magnifying optical system is a bi-telecentric optical system,
    a first distance between principal optical axes at an incident-side of the magnifying optical system is larger than a second distance between principal optical axes at an exit-side of the magnifying optical system,
    the magnifying optical system comprises an incident-side lens group on a side where a light beam forming the interference fringe is incident and an exit-side lens group on a side where the light beam is emitted and the interference fringe is projected towards the object surface,
    f1/f2>3, where f1 is a focal length of the incident-side lens group, and f2 is a focal length of the exit-side lens group, and
    the incident-side lens group and the exit-side lens group each have a positive refractive power, and an expression xd/(f1+f2)<2 is satisfied, where xd is a distance from an exit-side principal point of the incident-side lens group to an incident-side principal point of the exit-side lens group.

2. The interference fringe projection optical system of claim 1, wherein the two optical emitters comprise respective emission end faces of two optical fibers.

3. The interference fringe projection optical system of claim 1, wherein the magnifying optical system forms an image of the optical emitters further on an exit side than the magnifying optical system.

4. The interference fringe projection optical system of claim 3, further comprising a glass plate arranged further on the exit side than the image of the optical emitters.

5. The interference fringe projection optical system of claim 1, wherein the incident-side lens group and the exit-side lens group each comprise a single lens.

6. The interference fringe projection optical system of claim 5, wherein the incident-side lens group comprises a plano-convex lens, an incident side of the plano-convex lens is a flat surface, and an exit side of the plano-convex lens is a convex surface.

7. The interference fringe projection optical system of claim 5, wherein the exit-side lens group comprises a ball lens.

8. The interference fringe projection optical system of claim 7, wherein the ball lens comprises glass material with a refractive index n of 1.7 or greater for a wavelength in use.

9. An interference fringe projection optical system comprising:
   a plurality of the interference fringe projection optical systems of claim 1,
   wherein the plurality of interference fringe projection optical systems project an interference fringe by projection areas of the interference fringe complementing each other by time division.

10. A shape measurement apparatus comprising:
    the interference fringe projection optical system of claim 1;
    an imager configured to capture an image of a projected image of the interference fringe; and
    a calculator configured to calculate unevenness information of the object surface using an image signal from the imager.

11. A shape measurement apparatus comprising:
    the interference fringe projection optical system of claim 1;
    an imager, wherein a position of an image of the interference fringe generating optical system is not included in an imaging range of the imager, and the imager is configured to capture an image of the interference fringe projected on the object surface further on an exit side than the image of the interference fringe generating optical system; and
    a calculator configured to calculate unevenness information of the object surface using an image signal from the imager.

\* \* \* \* \*